United States Patent Office 2,954,339
Patented Sept. 27, 1960

2,954,339

DESULFURIZATION OF PETROLEUM HYDROCARBONS EMPLOYING AN ARSENIC-CONTAINING CATALYST

David K. Beavon, Darien, Conn., assignor to Texaco Inc., a corporation of Delaware No Drawing. Filed Feb. 14, 1958, Ser. No. 715,201

13 Claims. (Cl. 208—216)

This invention relates to the treatment of hydrocarbons. More particularly, it relates to the catalytic treatment of a hydrocarbon fraction with a catalyst which has been used in a previous hydrocarbon treating operation. In one specific embodiment of the invention, a cobalt-molybdenum-alumina catalyst which has been used for the pretreatment of straight run naphtha is used for the upgrading of another hydrocarbon fraction, such as for example, a gas oil.

Currently, much of the petroleum destined for use as a motor fuel is subjected to catalytic reforming. In the catalytic reforming process a straight run naphtha that is, a liquid fraction boiling up to about 400° F. is contacted with a reforming catalyst. In the catalytic reforming procedure various octane improving reactions take place. In the more important of these reactions, naphthenes containing 6 membered rings are dehydrogenated to aromatics, alkyl naphthenes containing 5 membered rings are dehydroisomerized to aromatics, and $C_6$ and higher paraffins are dehydrocyclized to aromatics. Various other reactions such as the isomerization of straight chain paraffins to branched chain paraffins and the hydrocracking of paraffins also take place.

One of the more popular catalysts used in the catalytic reforming of naphthas is the platinum type of catalyst. The platinum reforming catalyst, like many other catalysts, is susceptible to poisoning and it has been found that sulfur, nitrogen, halides, and metals such as iron, lead, copper and arsenic, all of which may be found in varying amounts in straight run naphtha either are particularly harmful to the platinum reforming catalyst or inhibit or overactivate some of the reforming reactions. To protect the platinum type reforming catalyst it is customary to pretreat the feed to the catalytic reforming unit with, for example, a cobalt-molybdenum-alumina catalyst to effect the removal of sulfur, nitrogen, halides and metals such as arsenic from the reformer feed. The pretreatment is generally effected by passing the catalytic reformer feed into contact with a cobalt-molybdenum-alumina catalyst at a temperature of about 500 to 800° F. and a pressure of about 50 to 800 p.s.i.g. in the presence of hydrogen. Eventually the cobalt-molybdenum-alumina catalyst even with periodic regeneration reaches the stage where it can no longer effect satisfactory pretreatment of the catalytic reformer feed and when this stage has been reached the catalyst is considered spent and is discarded.

According to one embodiment of the present invention the used spent catalyst is not discarded but is used for the treatment of other hydrocarbon fractions.

The catalyst which is used in the process of the present invention is generally considered as being a mixture of the oxides of molybdenum and cobalt supported on alumina and is frequently referred to as a cobalt molybdate catalyst. Usually it contains from about 8 to 18% of active ingredients reported as the oxides of cobalt and molybdenum supported on alumina in the ratio of 0.3 to 1.5 mols of cobalt per mol of molybdenum and may also contain a stabilizer such as silica. The pretreatment of the catalytic reformer feedstock for which the catalyst used in the process of the present invention has been utilized is effected by passing the catalytic reformer feed over the cobalt-molybdenum-alumina catalyst at a temperature between about 500–800° F. and a pressure between 50 and 800 p.s.i.g. in the presence of hydrogen. In the course of the pretreatment sulfur, nitrogen, halides and metals such as arsenic are removed from the feed. The sulfur in compounds such as mercaptans and thiophenes is converted for the most part to $H_2S$ which is removed from the effluent stream. It has also been suggested that some of the sulfur reacts with a portion of the catalyst to form cobalt sulfide and molybdenum sulfide which may then function as the catalyst. The nitrogen in compounds such as pyridines and pyrroles is converted to $NH_3$ which like the $H_2S$ is removed from the effluent stream. Halides are converted to free acids or their ammonium salts which are also removed from the effluent stream. The metallic impurities, however, are deposited on the catalyst together with carbon which is formed as a result of the cracking of some of the feed. When sufficient carbon has been deposited on the catalyst to impair its activity the catalyst is regenerated with a mixture of air and an inert gas such as steam or flue gas which serves to reduce the oxygen content of the mixture to below 10%. The carbon which has been deposited on the catalyst during the processing period is removed by combustion with the oxygen of the regenerating gas. However, the metallic impurities which were present in the feed and were deposited on the catalyst during the processing period are not removed by the regeneration and accordingly, in spite of periodic regenerations there is a progressive buildup of metals on the catalyst. The presence of arsenic on the catalyst can be tolerated as long as the arsenic is present in fairly small amounts. However, when the arsenic concentration approaches about 0.8% by weight of the catalyst, the catalyst can no longer remove arsenic from the feed and consequently is no longer satisfactory for the pretreatment of the catalytic reformer feed. Because of the large investment in the platinum catalyst which, depending on the size of the unit, may be of the order of several hundred thousand dollars, it has been the custom, as a precautionary measure, to discontinue the use of the cobalt-molybdenum-alumina catalyst when the arsenic concentration of the catalyst reaches from about 0.4 to 0.6 weight percent. Usually, by the time the arsenic concentration of the catalyst has reached 0.4–0.6 weight percent the catalyst has had an effective life of several hundred bbls. of feedstock per lb. of catalyst depending on the arsenic concentrations of the feed and it has been deemed expedient by those skilled in the art to consider the catalyst spent at this stage and to discard the catalyst rather than jeopardize the life of the platinum type catalyst by subjecting it to the dangers of arsenic poisoning. Actually, however, this spent catalyst which is ordinarily discarded has several properties which are superior to those of fresh catalyst and it is the discovery of these properties which forms the basis of the present invention.

In one embodiment of the process of the present invention the spent cobalt-molybdenum-alumina catalyst which has been used for the pretreatment of catalytic reforming feed and is considered no longer satisfactory for that purpose is used for the treatment of other stocks, particularly the hydrogenation and denitrification of other hydrocarbon mixtures.

The invention, however, is not confined to the use of cobalt-molybdenum-alumina catalyst which has become spent for the pretreatment of catalytic reformer feed. Catalysts which have been used for the pretreatment of straight run naphtha for catalytic reformer feed for relatively short periods of time also show properties superior to those of fresh catalyst.

Although I do not wish to be bound by the following theory, it is believed that the presence of small amounts of halides and metals such as iron, copper and particularly arsenic, exerts a beneficial influence of the hydrogenation and nitrogen removal properties of the cobalt-molybdenum-alumina catalyst and renders the catalyst containing small amounts of these materials more efficient for hydrogenation and denitrification purposes than fresh catalyst without effecting any appreciable change in the desulfurization properties of the catalyst.

Hydrocarbon fractions such as thermally and catalytically cracked naphthas, kerosenes and gas oils derived from virgin stocks, from thermal cracking, coking and vis-breaking operations, from catalytic cracking, from shale oil, from tar sand oil and coal tar oils such as coal tar light oil, coal tar middle oil and coal tar heavy oil, may be satisfactorily treated by the process of the present invention, particularly for the saturation of olefins and the removal of nitrogen and sulfur.

The process of the present invention is carried out at temperatures between about 500 and 800° F. and preferably at 550 to 750° F. in the presence of hydrogen at pressures ranging from about 50 to 800 p.s.i.g. depending on the type and nature of the stock to be treated. Preferably the hydrogen is introduced with a hydrocarbon in a mol ratio of 0.6–3 mols of hydrogen per mol of hydrocarbon but ranges of 0.5–5 mols of hydrogen per mol of hydrocarbon may be used. The space velocity or weight of hydrocarbon per hour per unit weight of catalyst may range from 0.5 to 10 depending on the type and nature of the stock to be treated.

As stated above, the catalyst used in the process of the present invention is basically a cobalt-molybdenum-alumina catalyst generally considered to be a mixture of the oxides of cobalt and molybdenum, the active ingredients being reported as the oxides of cobalt and molybdenum and usually amounting to between about 8 and 18% by weight of the catalyst in the ratio of about 0.3 to 1.5 mols of cobalt per mol of molybdenum. The catalyst as used in the process of the present invention contains as small amount of arsenic, not more than about 0.8%, usually not more than about 0.4–0.6% and not less than about 0.01% by weight which has been deposited on the catalyst during its use in the pretreatment of catalytic reformer feed. The catalyst, as is evident from the following examples, which are given solely for illustrative purposes, not only is essentially equivalent to fresh catalyst for desulfurization purposes but shows olefin saturation and denitrification properties superior to those of freshly prepared unused catalyst.

*Example I*

This example shows comparative results between fresh and spent cobalt-molybdenum-alumina catalysts. The fresh catalyst contains 2.4 weight percent cobalt, 5.5 weight percent molybdenum and is free of arsenic. The used catalyst, which in this case, is considered spent for the pretreatment of catalytic reformer feed contains 2.3 weight percent cobalt, 5.3 weight percent molydenum and 0.56 weight percent arsenic, the arsenic being deposited on the catalyst during the treatment of straight run naphtha. The feedstock is a mixture of 63 volume percent heavy catalytically cracked gasoline and 37 volume percent heavy thermal cracked gasoline having the following characteristics:

ASTM distillation range, ° F.:
  IBP _____ 210
  10% _____ 244
  50% _____ 300
  90% _____ 372
  EP _____ 410
Bromine No. _____ 55
Basic nitrogen, p.p.m. _____ 258
Sulfur, Lamp., wt. percent _____ 0.57

Data on comparative runs at 625° F. are tabulated below:

|  | Fresh Catalyst | Used Catalyst |
|---|---|---|
| Reaction Conditions: |  |  |
| Temperature, °F | 625 | 627 |
| Pressure, p.s.i.g | 649 | 650 |
| Space velocity, wt./hr./wt | 4.70 | 4.71 |
| Hydrogen to hydrocarbon, mol ratio | 0.9 | 0.9 |
| Hydrogen consumption, s.c.f./bbl | 440 | 451 |
| Liquid Product: |  |  |
| Volume percent recovery | 101.09 | 102.07 |
| Sulfur, Lamp., wt. percent | 0.130 | 0.132 |
| Sulfur Reduction, percent | 77.2 | 76.84 |

This example shows that, in spite of the fact that the used catalyst would ordinarily be considered spent, its desulfurization activity is essentially the same as that of fresh catalyst.

*Example II*

This example, in which the same catalysts and feedstock used in Example I are used, shows the relative denitrification properties of the used and fresh catalysts.

|  | Used Catalyst | | | Fresh Catalyst | | |
|---|---|---|---|---|---|---|
| Reaction Conditions: |  |  |  |  |  |  |
| Temperature, °F | 627 | 680 | 749 | 628 | 679 | 750 |
| Pressure, p.s.i.g | 650 | 650 | 650 | 650 | 650 | 650 |
| Space Velocity, wt./hr./wt | 4.71 | 4.71 | 4.71 | 4.69 | 4.71 | 4.72 |
| Hydrogen to hydrocarbon, mol ratio | 0.9 | 0.9 | 0.9 | 0.9 | 0.9 | 0.9 |
| Hydrogen consumption, s.c.f./bbl | 451 | 582 | 589 | 466 | 499 | 520 |
| Liquid Product: |  |  |  |  |  |  |
| Volume Percent recovery | 102.07 | 102.18 | 101.32 | 101.81 | 101.97 | 101.09 |
| Basic N, p.p.m | 139 | 66 | 33 | 178 | 101,107 | 66 |
| Basic N reduction, percent | 46.3 | 74.42 | 87.28 | 31.01 | 59.69 | 74.42 |

It is obvious from the above that the spent catalyst is more efficient for denitrification than is the fresh catalyst. At 627° F., for example, the spent catalyst is approximately 150% as effective for denitrification as the fresh catalyst. At 680° F., it is approximately 125% as effective for denitrification as the fresh catalyst. At 750° F. the spent catalyst is approximately 118% as effective for denitrification as the fresh catalyst.

*Example III*

This example, in which the same catalysts and feedstock used in Example I are used, shows the relative olefin saturation properties of spent and fresh catalysts:

|  | Spent Catalyst | | Fresh Catalyst | |
|---|---|---|---|---|
| Reaction Conditions: |  |  |  |  |
| Temperature, °F | 548 | 622 | 550 | 625 |
| Pressure, p.s.i.g | 650 | 650 | 650 | 649 |
| Space Velocity, wt./hr./wt | 4.72 | 4.71 | 4.73 | 4.70 |
| Hydrogen to hydrocarbon, mol ratio | 0.8 | 0.8 | 0.8 | 0.8 |
| Hydrogen consumption, s.c.f./bbl | 322 | 451 | 257 | 440 |
| Liquid Product: |  |  |  |  |
| Volume Percent Recovery | 100.55 | 102.07 | 100.10 | 101.09 |
| Bromine No.[1] | 34, 36 | 11, 11 | 42, 41 | 19, 15 |
| Bromine No., Reduction, Percent | 36.36 | 80.00 | 23.64 | 69.09 |

[1] Two determinations.

This example shows that for olefin saturation the spent catalyst is superior to fresh catalyst.

Example IV

In this example, the used cobalt-molybdenum-alumina catalyst had been used for the pretreatment of straight run naphtha for a relatively short period of time and contained 2.0 weight percent cobalt, 5.6 weight percent molybdenum and 0.037 weight percent arsenic. Fresh catalyst used in comparative runs contained 2.4 weight percent cobalt, 5.5 weight percent molybdenum and was arsenic-free.

|  | Used Catalyst | Fresh Catalyst |
|---|---|---|
| Reaction Conditions: |  |  |
| Temperature, °F | 625 | 626 |
| Pressure, p.s.i.g | 650 | 650 |
| Space velocity, wt./hr./wt | 4.71 | 4.71 |
| Hydrogen to hydrocarbon, mol ratio | 0.9 | 0.8 |
| Hydrogen consumption, s.c.f./bbl | 403 | 369 |
| Liquid Product: |  |  |
| Volume Percent Recovery | 102.10 | 101.71 |
| Sulfur, Lamp., wt. percent | 0.109 | 0.132 |
| Sulfur Reduction, wt. percent | 80.88 | 76.84 |
| Bromine No.[1] | 12,11 | 15,16 |
| Bromine No. Reduction, Percent | 78.18 | 70.91 |
| Basic N, p.p.m | 149 | 179 |
| Basic N Reduction, Percent | 42.25 | 30.62 |

[1] Two determinations.

Example V

Example IV is repeated using temperatures of approximately 550° F.

|  | Used Catalyst | Fresh Catalyst |
|---|---|---|
| Reaction Conditions: |  |  |
| Temperature, °F | 555 | 549 |
| Pressure, p.s.i.g | 650 | 650 |
| Space Velocity, wt./hr./wt | 4.66 | 4.67 |
| Hydrogen to hydrocarbon, mol ratio | 0.8 | 0.8 |
| Hydrogen consumption, s.c.f./bbl | 338 | 319 |
| Liquid Product: |  |  |
| Volume Percent Recovery | 100.85 | 100.43 |
| Bromine No | 35 | 43 |
| Bromine No. Reduction, Percent | 36.36 | 21.82 |
| Sulfur, Lamp., wt. percent | 0.420 | 0.45 |
| Sulfur Reduction, Percent | 26.32 | 21.05 |
| Basic N, p.p.m | 213 | 230 |
| Basic N Reduction, Percent | 17.44 | 10.85 |

From the results obtained in Examples IV and V, it is obvious that cobalt-molybdenum-alumina catalyst which has been used for the pretreatment of straight run naphtha and which contains less than 0.1 weight percent arsenic, is superior to fresh unused catalyst which contains no arsenic.

The present invention thus extends the useful life of cobalt-molybdenum catalysts. Fresh cobalt-molybdenum-alumina catalyst may be used for the pretreatment of straight run naphtha prior to the catalytic reforming of the pretreated naphtha, and when the cobalt-molybdenum-alumina-catalyst is no longer satisfactory for the pretreatment of the straight run naphtha, it is not discarded but is used for the treatment of other stocks such as cracked naphthas, kerosenes, gas oils derived from virgin stocks, from thermal or catalytic cracking, from shale oil, from tar sand oil and coal tar distillates such as light, middle and heavy coal tar oils.

It is also possible, by means of the present invention, to prolong the useful life of the cobalt-molybdenum-alumina catalyst by alternating the feed, for example first treating straight run naphtha to be used for catalytic reforming, then before the catalyst becomes spent treating another fraction such as a cycle gas oil and then using the catalyst again for the pretreatment of straight run naphtha for catalytic reformer feed.

It will be understood, of course, that in any of the procedures outlined above, the catalyst is periodically regenerated with air and an inert gas to remove the carbon deposited on the catalyst. For example, in the alternating procedure outlined above, the catalyst is used to treat straight run naphtha until regeneration is required then the catalyst is regenerated and used to treat, for example, cracked naphtha until regeneration is required, and after regeneration is again used to treat the straight run naphtha.

Obviously many modifications and variations of the invention, as hereinbefore set forth, may be made without departing from the spirit and scope thereof, and therefore only such limitations should be imposed as are indicated in the appended claims.

I claim:

1. A process for upgrading a hydrocarbon fraction which comprises contacting a hydrocarbon fraction selected from the group consisting of thermally cracked naphtha, catalytically cracked naphtha, kerosene, gas oil and coal tar distillate at a temperature between about 500° F. and 800° F. and a pressure between about 50 and 800 p.s.i.g. in the presence of hydrogen with a cobalt-molybdenum-alumina catalyst which has previously been used for the treatment of straight run naphtha for a period of time sufficient to deposit on the catalyst at least 0.01 weight percent arsenic.

2. A process for the separate upgrading of a straight run naphtha and a hydrocarbon fraction selected from the group consisting of thermally cracked naphtha, catalytically cracked naphtha, kerosene, gas oil and coal tar distillate which comprises contacting a straight run naphtha with a cobalt-molybdenum-alumina catalyst at a temperature between about 500° F. and 800° F. and a pressure between about 300 and 800 p.s.i.g. in the presence of hydrogen for a period of time sufficient to deposit on said catalyst between 0.01 and 0.8 weight percent arsenic, discontinuing the flow of said straight run naphtha and then contacting said catalyst containing arsenic with a hydrocarbon fraction selected from said group at a temperature between 500° F. and 800° F. and a pressure between 50 and 800 p.s.i.g. in the presence of hydrogen.

3. The process of claim 2 in which the hydrocarbon fraction is a gas oil.

4. The process of claim 2 in which the hydrocarbon fraction is a thermally cracked naphtha.

5. The process of claim 2 in which the hydrocarbon fraction is a catalytically cracked naphtha.

6. The process of claim 2 in which the hydrocarbon fraction is a coal tar distillate.

7. The process of claim 2 in which the hydrocarbon fraction is kerosene.

8. A process for upgrading a hydrocarbon fraction which comprises contacting a hydrocarbon fraction selected from the group consisting of thermally cracked naphtha, catalytically cracked naphtha, kerosene, gas oil, and a coal tar distillate with a cobalt-molybdenum-alumina catalyst at a temperature between 500° F. and 800° F. and a pressure between 50 and 800 p.s.i.g. in the presence of hydrogen, said cobalt-molybdenum-alumina catalyst containing between 0.01 and 0.8 weight percent arsenic.

9. The process of claim 8 in which the hydrocarbon fraction is a gas oil.

10. The process of claim 8 in which the hydrocarbon fraction is a thermally cracked naphtha.

11. The process of claim 8 in which the hydrocarbon fraction is a catalytically cracked naphtha.

12. The process of claim 8 in which the hydrocarbon fraction is kerosene.

13. A process for the removal of sulfur and nitrogen impurities from a gas oil fraction which comprises contacting said gas oil fraction with a cobalt-molybdenum-alumina catalyst at a temperature between about 550° F. and 750° F. and a pressure between about 50 and 800 p.s.i.g. in the presence of hydrogen, said catalyst having previously been used for the desulfurization of an arsenic-containing straight run naphtha for a period of time sufficient to deposit on said catalyst between 0.01 and 0.8 weight percent arsenic.

References Cited in the file of this patent

UNITED STATES PATENTS

| | | |
|---|---|---|
| 2,697,683 | Engel | Dec. 21, 1954 |
| 2,739,132 | Riedl | Mar. 20, 1956 |